United States Patent Office 2,730,501
Patented Jan. 10, 1956

2,730,501

MINERAL OIL COMPOSITIONS HAVING STABILIZED LOW POUR POINTS

Ferdinand P. Otto, Woodbury, N. J., assignor to Socony Mobil Oil Company, Inc., a corporation of New York No Drawing. Application December 31, 1952,
Serial No. 329,089

3 Claims. (Cl. 252—57)

This invention relates to lubricating oil compositions. More particularly, it is concerned with oil compositions having stabilized low pour points.

As is well known, the A. S. T. M. pour point of a waxy mineral lubricating oil may be substantially lowered by adding to the oil a small amount of a certain type of chemical agent having wax-modifying properties. Such agents are known as pour point depressants. Oils of low pour point are, of course, highly desirable for use where low temperatures are encountered. Thus, automobile engine oils designed for winter use are generally fortified with pour depressants in order to provide easier starting and better lubrication of the engine parts in cold engines.

A major problem has been encountered, however, in the use of pour depressants, viz., pour point reversion. This is the tendency of an oil, which has had its pour point lowered by the addition of a pour depressant, to revert to a higher pour point when subjected to temperature cycling, as, for example, during winter storage. Thus, an oil containing a pour depressant may have an initial A. S. T. M. pour point of —20° F., but during storage may be found to be solid at temperatures much higher than the original pour point. One type of pour depressant which is subject to pour point reversion is that formed by the reaction of alkyl hydroxyaromatic compounds with organic acids, particularly the wax phenol esters of carboxylic acids. In accordance with the present invention, however, we have now found that pour depressants of this type can be stabilized against pour point reversion by either of the two following procedures (1) treating the pour depressant with a solid absorbent material selected from the group consisting of activated carbon, silica gel and bead cracking catalyst of the silica-alumina type, for a period of from about ½ hour to about 5 hours and at a temperature of from about 50° C. to about 200° C. or (2) treating the alkyl hydroxyaromatic reactant prior to reacting it with the carboxylic acid to form the ester pour depressant with the solid absorbent in the manner just outlined.

It is, therefore, the object of this invention to provide a method for the stabilization of alkyl hydroxyaromatic ester-type pour depressants. Another object is to provide novel stabilized pour depressants of the aforesaid type. Still another object is to provide oil compositions containing these stabilized pour depressants, said compositions being thereby inhibited against pour point reversion.

Many solid absorbents are well known to those familiar with the art. Examples of a few such materials are silica gel, alumina, clay, pelleted silica-containing catalysts, etc. However, only the bead-form cracking catalysts of the silica-alumina type, silica gel and activated carbon are effective for the purposes of the present invention. The activated carbon contemplated herein is the charcoal obtained from dense carbonaceous matter, such as nut shells and wood. Non-limiting examples of activated carbon absorbents are coconut charcoal, wood charcoal, etc.

The bead cracking catalyst absorbents contemplated herein are hard, homogeneous, porous and dried inorganic oxide true hydrogel particles containing silica and alumina. They are prepared by initially forming a hydrosol of inorganic oxide, including silica and alumina. The hydrosol is then introduced, in the form of separate globules, into a fluid medium which is substantially immiscible with water and which is maintained at a temperature below the boiling point of the hydrosol. During this operation, the globules assume a spheroidal shape. The globules are kept in this medium for a period of time sufficient to effect gelation. The resulting gel spheroids are then washed with water to remove water-soluble salts. Subsequently, they are base exchanged with a solution containing a cation capable of replacing alkali metals. Finally, they are dried. For the purposes of this invention, the $SiO_2:Al_2O_3$ weight ratio in the finished beads should fall, preferably, within the range varying between about 20:1 and about 6:1, respectively.

For example, the foregoing is effected by initially mixing aqueous solutions of sodium silicate and of aluminum sulfate, in suitable proportions to produce the desired $SiO_2:Al_2O_3$ weight ratio in the final product. The resulting hydrosol is then introduced through orifices into the top of an 8-foot column of gas oil maintained at room temperature (about 20° C.). The globules of hydrosol fall through the oil, and gel before passing into a layer of water located beneath the oil. The gel spheroids are carried from the bottom of the column by a stream of water. On removal from the water, they are washed with petroleum naphtha to remove oil from their surfaces. The spheroids are then first washed with water and subsequently with an aqueous solution of ammonium chloride, to replace zeolitically-held sodium ions with ammonium ions. The latter can be driven off as ammonia gas by heat. The spheroids are then dried slowly and uniformly at 180° F. until shrinkage is substantially complete. Drying is continued at a gradually increasing temperature up to about 1050° F., at which temperature the spheroids are maintained for about 2 hours.

The spheroidal, hydrogel catalysts can be prepared in various sizes, as crushed spheroids or as ground beads. Likewise, the spheroids can have relatively high or low apparent densities. In practice, however, it is preferred to use a bead catalyst having a bulk density of between about 0.4 and about 1.0. Beads of higher densities can be used, if the contact time is increased. Throughout the specification and claims of the present application the following terms will be used to identify specific catalyst forms: The terms "whole beads" and "commercial beads" refer to spheroidal gel catalysts having diameters of between about 3 and about 7 millimeters. "Whole beads" is the generic term and "commercial beads" denotes those catalysts prepared on a commercial scale for general catalytic purposes. "Bead fines" are the undersized and/or fractured, or otherwise imperfect, rejects from the production of whole beads. "Ground bead fines" are the "bead fines" which have been ground to a uniform small particle size. By the term "low density bead" is meant a whole bead having an apparent density of about 0.5. All of these forms are included within the scope of the term "bead (or spheroidal) cracking catalyst containing silica and alumina."

The weight ratio of the absorbent to the reaction product comprising the ester of the carboxylic acid with the alkyl-substituted aromatic compound, or with the alkyl-substituted aromatic compound per se, in the process of the invention does not appear to be too critical a factor. It will vary with apparent density and with surface area. For example, less of a ground bead fine will be required than would be required when using whole beads, due to the greater surface area of the ground bead fines. In practice, weight ratios of the ester reaction product, or the alkyl-substituted aromatic compound, to absorbent as low as 0.75:1 and as high as 1.75:1 have proved successful. It is generally preferred to use a weight ratio of about 1:1.

The temperature at which the contact between the absorbent and the ester reaction product, or alkyl-substituted aromatic compound reactant, is effected varies between about 50° C. and about 200° C., preferably between about 75° C. and about 150° C. As is often the case in processes involving chemicals, the contact temperature and the contact time are somewhat interdependent. Thus, the longer contact times will be used at lower temperatures and vice versa. The range of contact time is between about ½ hour and about 5 hours, preferably between about 1 hour and about 4 hours. By way of example, a contact time of about 1¼ hours affords effective results when operating at about 150° C., and a contact time of about 4 hours is effective at a temperature of about 75° C. It is especially preferred to operate at about 125° C. for about 2 hours.

The contact operation can be conducted batchwise, or by a continuous process. A continuous process, for example, can be effected by allowing the material to be contacted to flow over or through a fixed bed of solid absorbent. Likewise, the contact can be effected by countercurrently flowing the absorbent and the ester reaction product or the alkyl-substituted aromatic compound reactant.

After the contact operation is completed, separation is effected by any of the usual, well-known methods for separating solids from fluids, such as by filtration. In practice, it is desirable, though not necessary, to dilute the unabsorbed material with a non-polar hydrocarbon solvent, such as A. S. T. M. precipitation naphtha, petroleum ether, etc. After separation of the absorbent, the solvent is removed from the unabsorbed material by usual methods, such as by evaporation or by distillation means.

If it should be desired to remove the absorbed material, in order to regenerate the absorbent, this can be done readily. The separated absorbent is extracted with a selective solvent for the absorbed material. Such solvents are polar mixtures, such as, for example, a 2:1 (volume) benzol-acetone solution. The solvent is then removed, as by distillation, affording the absorbed material as the residue. After such an extraction, the absorbent can be reused in the contact operation, with little or no makeup absorbent being required.

As already indicated hereinbefore, the present invention provides for the stabilization of pour point depressants comprising the esters formed by reacting carboxylic acids with wax-alkylated hydroxyaromatic compounds by treating either the finished ester product pour depressant or the alkyl hydroxyaromatic compound reactant, prior to forming the pour depressant therewith, with the solid absorbent.

The wax-alkylated hydroxyaromatic compounds which may be utilized herein are, for example, alkylated phenol, cresols, pyrogallol, naphthol, anthrazole and the like, which have been alkylated on the nucleus thereof with a chlorinated hydrocarbon wax in the presence of a Friedel-Crafts catalyst, the chlorinated wax being reacted with the hydroxyaromatic compound in a weight ratio wherein sufficient chlorinated wax is provided in the reaction to supply approximately 4 atomic weights of chlorine per mole of the hydroxyaromatic compound. Pour depressants prepared from a wax-hydroxyaromatic compound prepared utilizing a chlorinated wax of 18% chlorine content with a hydroxyaromatic compound in the aforesaid proportions are particularly improved by the method of this invention as compared to wax alkylated hydroxyaromatic compounds prepared from chlorinated wax of lower chlorine content, such as a wax containing about 14% chlorine, since the latter are normally more stable pour depressants than the former.

The carboxylic acid which is reacted with the alkyl hydroxyaromatic compound to form the pour depressants which are improved by the method of the invention may be substituted or unsubstituted organic mono- or polybasic acids, their acid anhydrides, or the acid halides thereof. Non-limiting examples of the carboxylic acid reactant are the following carboxylic acids and the acyl chlorides and acid anhydrides thereof: The monocarboxylic saturated, aliphatic acids having molecular weights as low as acetic acid and as high as montanic, such for example as acetic, butyric, capric, palmitic, stearic and montanic, corresponding respectively to the acyl radicals acetyl, butyryl, capryl, palmityl, stearoyl and montanyl; unsaturated aliphatic monobasic acids such as oleic and acrylic, corresponding to the acyl radicals oleyl and acrylyl; saturated aliphatic polybasic acids such as succinic, oxalic, adipic, sebacic, etc.; unsaturated aliphatic polybasic acids such as fumaric; substituted mono- and polybasic aliphatic acids containing halogen, hydroxyl, amino or keto groups such as chloracetic acid, tartaric acid, glycollic acid, pyruvic acid and acetoacetic acid; aromatic monobasic acids such as benzoic and naphthoic; aromatic polybasic acids such as phthalic; alkylene-substituted aromatic monobasic acids such as cinnamic; aryl-substituted mono- and polybasic aliphatic acids with COOH in side chain such as xylic, phenylstearic, naphthylstearic and naphthylpolystearic, etc.; substituted aromatic mono- and polybasic acids containing halogen, hydroxyl, amino, alkyl, aryl, aralkyl, keto, nitro or alkoxy in the ring such as chlorbenzoic, salicylic, anthranilic, toluic, phenylbenzoic, benzylbenzoic, nitrobenzoic, anisic and benzoylbenzoic acid; non-benzenoid cyclic mono- and polycarboxylic acids such as naphthenic, abietic and camphoric acids and heterocyclic carboxylic acids such as furoic acid. In forming the acid chlorides of the hydroxy and/or amino-substituted acids mentioned above, it is desirable to first acylate these substituted groups before preparing the corresponding acyl chlorides. Of the above acylating agents those corresponding to benzoic, toluic, etc.; to the dicarboxylic aromatic acids of the class typified by phthalic acid; to acetic and stearic, and to the aliphatic dibasic acids, as adipic, sebacic and succinic acids yield the better results.

A typical alkyl hydroxyaromatic ester-type pour depressant which is subject to pour point reversion and which is improved by the method of this invention is that formed by the reaction of wax-phenol (4–18) with benzoyl chloride. This material is utilized in the following examples and tests which will serve to illustrate the invention with respect to the improvement provided by the treatment of the pour depressant per se with the solid absorbents in the manner of the invention. This pour depressant was prepared as shown in the following example.

EXAMPLE A (a) *Preparation of wax-phenol (4–18)*

A paraffin wax melting at approximately 120° F. and predominantly comprised of compounds having at least 20 carbon atoms in their molecules was melted and heated to about 200° F. after which chlorine was bubbled therethrough until the wax had absorbed about 18% of chlorine. A quantity of chlorwax thus obtained, containing 4 atomic proportions of chlorine, was heated to a temperature of about 140–150° F. and 1 mole of phenol ($C_6H_5OH$) was admixed therewith. The mixture was heated to about 150° F., and a quantity of anhydrous aluminum chloride corresponding to about 3% of the weight of the chlorwax in the mixture was slowly added with active stirring. The rate of addition of the aluminum chloride was sufficiently slow to avoid violent foaming and during the addition the temperature was held at about 150° F. After the aluminum chloride had been added, the temperature of the mixture was increased slowly over a period of from 15 to 25 minutes to a temperature of about 250° F. and then more slowly increased to about 350° F. To control the evolution of HCl gas the temperature was raised from 250° F. to 350° F. at a rate of approximately 1 degree per minute, the whole heating operation occupying approximately 2 hours from the time of adding the aluminum chloride. The final temperature was held at 350° F. for a short time to allow completion of the reaction. To avoid cracking of the wax, the mixture should not be heated appreciably above 350° F. and it was held at that temperature for about 5 hours.

It is important that all unreacted or non-alkylated hydroxyaromatic material (phenol) remaining after the alkylation reaction be removed. This removal was effected by water-washing and the product was then treated with superheated steam to insure complete removal of the unreacted material and accomplish the drying of the product.

The wax-substituted phenol prepared according to the above procedure in which a quantity of chlorwax containing 4 atomic proportions of chlorine and having a chlorine content of 18% is reacted with 1 mole of phenol will be hereinafter designated as "wax-phenol (4-18)."

(b) *Preparation of (4-18) wax-phenyl benzoate*

A 200-gram portion of the wax-phenol (4-18) prepared in (a) and 30 grams of benzoyl chloride were mixed together and heated to a temperature of 275° F. This temperature was maintained for approximately 20 minutes, at which point evolution of hydrogen chloride ceased. The product was washed 6 times with water containing 2% butanol to remove all traces of aluminum chloride therefrom.

EXAMPLES 1–7

Each of 7 portions of the (4-18) wax-phenyl benzoate product, prepared as described in Example A, was treated with bead fines or with whole beads, in accordance with the following general procedure:

The ester reaction product to be improved and the absorbent, in the preferred weight ratios, were placed in a reaction vessel. The mixture was heated to a predetermined temperature, and maintained at that temperature for the contact time selected with agitation unless otherwise indicated. At the end of the contact period, the mixture was allowed to cool to ambient temperature (about 20° C.). Then, it was diluted with A. S. T. M. precipitation naphtha and filtered to remove the absorbent containing the ineffective materials. The naphtha solvent was removed from the filtrate by distillation under reduced pressure at a maximum pot temperature of about 200° C., leaving the desired, improved pour point depressant as the residue.

In each treatment the contact time and the contact temperature were varied, while the weight ratio of reaction product to absorbent was maintained constant. In one instance, stirring was not used. Pertinent data for the treating conditions and for the pour point depressant characteristics and the maximum pour point of mineral lubricating oil blends of each treated product are set forth in Table I.

Two mineral lubricating oils were used in evaluating the improved pour point depressants of this invention. Oil A is a Mid-Continent solvent-refined stock having a pour point of 25° F., a flash point of 430° F., a Saybolt Universal viscosity of 560 sec. at 100° F., and a V. I. of 95. Oil B is a solvent-treated Rodessa distillate stock, containing about 5% by weight, of a solvent-refined residual stock, and having a pour point of 20° F., a flash point of 425° F., a Saybolt Universal viscosity of 163 sec. at 100° F., and a V. I. of 118.

The maximum pour point method used herein is a laboratory test which comprises subjecting the oil under test to 3 complete temperature cycles of −30° F., to +20° F., during a period of 6 to 7 hours. The maximum pour point is reported as a temperature 5 degrees higher than the greatest pour point observed at any time during the test. This method is described in the 1945 A. S. T. M. Committee D–2 Standards on Petroleum Products.

The pour point determination is the standard A. S. T. M. Pour Test Method D97–27T, page 37, U. S. Bureau of Mines Technical Paper 323–B.

| Example | Material Treated | Absorbant | Bulk Density | Ratio, Material/Absorbent | Contact Time, Hrs. | Contact Temp., °C. | A. S. T. M. Pour Point,[2] Oil A Containing Unabsorbed Material | | | | Oil B Containing Unabsorbed Material | | | | | |
|---|---|---|---|---|---|---|---|---|---|---|---|---|---|---|---|---|
| | | | | | | | | | | | A. S. T. M. Pour Point[2] | | | | Max. Pour[2] | |
| | | | | | | | ¼% | ⅛% | ¹⁄₁₆% | ¹⁄₃₂% | 1% | 0.5% | 0.2% | 0.1% | 1% | 0.5% |
| | (4-18) Wax Phenyl Benzoate. | None | | | | | −25 | −15 | +5 | | <−30 | −25 | −5 | +10 | +10 | +10 |
| 1 | do | Bead Fines | 0.668 | 1:1 | 1 | 125 | <−30 | −30 | −15 | | <−30 | −30 | −15 | 0 | −10 | +5 |
| 2 | do | do | 0.668 | 1:1 | 2 | 125 | <−30 | −25 | −10 | +10 | <−30 | −30 | −20 | −5 | −10 | −5 |
| 3 | do | do | 0.668 | 1:1 | 2 | 75 | −30 | −20 | −10 | | −35 | −30 | −15 | 0 | −10 | 0 |
| 4 | do | do | 0.668 | 1:1 | [1]3 | 100 | <−30 | −25 | −15 | +5 | <−30 | −20 | 0 | 0 | −10 | −10 |
| 5 | do | Whole Beads | 0.693 | 1:1 | 1 | 125 | −25 | −20 | 0 | | <−30 | <−30 | −15 | +5 | −10 | +5 |
| 6 | do | do | 0.693 | 1:1 | 4 | 75 | −25 | −15 | 0 | | <−30 | −30 | −15 | +5 | −10 | 0 |
| 7 | do | do | 0.693 | 1:1 | 1.25 | 150 | −25 | −20 | −5 | +15 | <−30 | −30 | −15 | 0 | −5 | 0 |

[1] No stirring used.
[2] A. S. T. M. Pour Point and Maximum Pour Point reported in °F.

It will be apparent from the data in Table I, that operating at the times and temperatures of contact falling within the limits described hereinbefore produces treated products having pour point depressant properties superior to those of the original reaction product. Of much greater significance, the maximum pour point is greatly improved in each case. The foregoing examples illustrate, also, how the time and the temperature of contact are interrelated. The conditions which are most preferable, when using agitation, in order to produce the greatest maximum pour point improvement, are 2 hours contact at about 125° C.

EXAMPLES 8 THROUGH 10

Three portions of the (4-18) wax phenyl benzoate prepared as described in Example A were each treated for 2 hours at 125° C., using whole bead catalyst absorbents of high, low and intermediate apparent densities, respectively. Pertinent treatment and test data are set forth in Table II.

Table II
EFFECT OF APPARENT BULK DENSITY

| Example | Material Treated | Absorbent | Bulk Density | Weight Ratio, Material/Absorbent | Contact Time, Hrs. | Contact Temp., °C. | Maximum Pour Point, °F. [1] | |
|---|---|---|---|---|---|---|---|---|
| | | | | | | | 1% | 0.5% |
| | (4-18) Wax Phenyl Benzoate. | None | | | | | +10 | +10 |
| 8 | do | Whole Beads | 0.506 | 1:1 | 2 | 125 | 0 | 0 |
| 9 | do | do | 0.820 | 1:1 | 2 | 125 | -5 | 0 |
| 10 | do | do | 1.018 | 1:1 | 2 | 125 | +5 | +15 |

[1] Additive blended in Oil B in concentrations indicated.

From the data of Table II, it will be apparent that marked improvement in maximum pour point is attained by the present process regardless of the apparent density of the absorbent. The improvement is greatest when using absorbents of low or of intermediate apparent densities. However, products treated with high density absorbents are improved over the starting material and, accordingly, properly come within the scope of this invention.

EXAMPLES 11 THROUGH 15

Each of 5 portions of the (4-18) wax phenyl benzoate prepared as described in Example A were treated at 125° C., for 2 hours, and using various materials as absorbents. Pertinent data are set forth in Table III.

Table III
EFFECT OF USING VARIOUS ABSORBENTS

| Example | Material Treated | Absorbent | Weight Ratio, Material/Absorbent | Contact Time, Hrs. | Contact Temp., °C. | Maximum Pour Point, °F. [1] | |
|---|---|---|---|---|---|---|---|
| | | | | | | 1% | 0.5% |
| | (4-18) Wax Phenyl Benzoate. | None | | | | +10 | +10 |
| 11 | do | Silica gel | 1:1 | 2 | 125 | 0 | 0 |
| 12 | do | Activated carbon | 1:1 | 2 | 125 | 0 | +5 |
| 13 | do | Ground Bead Fines | 1:1 | 2 | 125 | 0 | +5 |
| 14 | do | Diatomaceous earth | 1:1 | 2 | 125 | +20 | +20 |
| 15 | do | Pelleted catalyst | 1:1 | 2 | 125 | +10 | +15 |

[1] Additive blended in Oil B in concentrations indicated.

It will be apparent, from the data set forth in Table III, that activated carbon, silica gel and bead cracking catalysts containing silica and alumina are the effective absorbent materials in this invention. It will be noted that a commercial pelleted cracking catalyst and diatomaceous earth are ineffective absorbents.

EXAMPLES 16 THROUGH 21

Six portions of the (4-18) wax phenyl benzoate prepared as described in Example A were each treated with different effective absorbents, at 125° C., for 2 hours, using varying ratios of absorbent to wax phenyl benzoate. Pertinent data are set forth in Table IV.

Table IV
EFFECT OF VARYING WEIGHT RATIO

| Example | Material Treated | Absorbent | Weight Ratio, Material/Absorbent | Contact Time, Hrs. | Contact Temp., °C. | Maximum Pour Point, °F. [1] | |
|---|---|---|---|---|---|---|---|
| | | | | | | 1% | 0.5% |
| | (4-18) Wax Phenyl Benzoate. | None | | | | +10 | +10 |
| 16 | do | Low density beads | 1:1 | 2 | 125 | -5 | 0 |
| 17 | do | do | 0.75:1 | 2 | 125 | -10 | -5 |
| 18 | do | Commercial beads | 1:1 | 2 | 125 | -5 | -5 |
| 19 | do | do | 1.4:1 | 2 | 125 | -10 | 0 |
| 20 | do | Coconut charcoal | 1:1 | 2 | 125 | -5 | +10 |
| 21 | do | do | 1.75:1 | 2 | 125 | -5 | +10 |

[1] Additive blended in Oil B in concentrations indicated.

The data in Table IV demonstrate that the weight ratio of absorbent to reaction product is not too critical when treating to improve the maximum pour point. Requirements vary with different densities, surface areas, etc. In this connection, it will be noted that a weight ratio of 0.75:1 is more effective when using low density beads, whereas a ratio of 1.2:1 is more effective in the case of commercial beads.

In order to further evaluate the treated products of this invention, the products of Examples 2 and 4 were subjected to a heat stability test. This test simulates the temperature conditions which may be encountered in lubricating internal combustion engines. Each 24 hours of this test is about equivalent to a 1000-mile road test in an automobile. Briefly, the test comprises stirring a sample of an oil blend containing the pour point depressant for 72 hours at 342° F.±1° F. The pour point of the oil is determined every 24 hours. It is considered that a satisfactory pour point depressant should have sufficient heat stability to depress the pour point to at least -10° F. after 72 hours. Results of this test are set forth in Table V. It will be apparent therefrom that the treated products of this invention have a greatly improved heat stability. This quality is most desirable in pour point depressants used in modern lubricating oils.

*Table V*

HEAT STABILITY TEST RESULTS

| Product Tested | Conc., Wt. percent in Oil A | Pour Point, °F. | | | |
|---|---|---|---|---|---|
| | | Initial | After 24 hrs. | After 48 hrs. | After 72 hrs. |
| (4-18) Wax Phenyl Benzoate | 0.1 | −10 | 0 | 0 | 0 |
| Example 2 | 0.1 | −15 | −15 | −15 | −15 |
| Example 4 | 0.1 | −25 | −15 | −15 | −10 |

To illustrate the improvement in the pour depressant obtained by treating the alkyl hydroxyaromatic compound reactant, in accordance with the method of the invention, prior to reacting it with the carboxylic acid to form the pour depressant ester, the following examples and tests are presented.

Two mineral lubricating oils were used in evaluating the pour point depressants. Oil A is a Mid-Continent solvent-refined stock having a pour point of 25° F., a flash point of 430° F., a Saybolt Universal viscosity of 560 sec. at 100° F., and a V. I. of 95. Oil B is a solvent-treated Rodessa distillate stock, containing about 5% by weight, of a solvent-refined residual stock and having a pour point of 20° F., a flash point of 425° F., a Saybolt Universal viscosity of 163 sec. at 100° F. and a V. I. of 118.

The maximum pour point method used herein is a laboratory test which comprises subjecting the oil under test to 3 complete temperature cycles of −30° F. to +20° F., during a period of 6 to 7 hours. The maximum pour point is reported as a temperature 5 degrees higher than the greatest pour point observed at any time during the test. This method is described in the 1945 A. S. T. M. Committee D-2 Standards on Petroleum Products.

The pour point determination is the standard A. S. T. M. Pour Test Method D97-27T, page 37, U. S. Bureau of Mines Technical Paper 323-B.

EXAMPLE 22

A portion of the (4-18) wax phenol, prepared as described hereinabove (Example A (a)), and a whole silica-alumina catalyst beads in a 1:1 ratio were placed in a reaction vessel. The mixture was heated to 100° C. and maintained at that temperature for about 3 hours, with agitation. Then, the mixture was allowed to cool to ambient temperatures (about 20° C.). It was diluted with A. S. T. M. precipitation naphtha, and filtered to remove the absorbent and absorbed material. The naphtha solvent was removed from the filtrate by distillation under reduced pressure at a maximum pot temperature of about 200° C., leaving the desired unabsorbed material.

The unabsorbed (4-18) wax phenol was then reacted with benzoyl chloride in the manner described above in Example A (b) to form a (4-18) wax phenyl benzoate pour depressant.

EXAMPLE 23

Another portion of the (4-18) wax phenol prepared in Example A (a) was treated in a manner similar to that described in Example 22, except that a bead fine absorbent was used instead of whole beads. The resulting wax phenol was reacted with benzoyl chloride in the manner of Example A (b).

Test data for the products of these 2 examples are set forth in Table VI.

*Table VI*

| Product of Example | A. S. T. M. Pour Point, °F. | | | | Maximum Pour Point, °F. | |
|---|---|---|---|---|---|---|
| | 1% | 0.5% | 0.2% | 0.1% | 1% | 0.5% |
| (4-18) Wax Phenyl Benzoate | −30 | −25 | −5 | +10 | +10 | +10 |
| 22 | −30 | −30 | −15 | 0 | −10 | −5 |
| 23 | −30 | −30 | −15 | −5 | −10 | 0 |

The comparative data of Table VI show that the benzoate ester reaction products, prepared from the wax phenol (4-18) treated in accordance with this invention, have superior pour point depressant characteristics. More important, it will be noted that the stability of these additives, as shown by the maximum pour point test, is excellent.

Alkyl hydroxyaromatic ester-type pour depressants are apt to lose their pour depressant properties when subjected to fluctuations in temperature which occur in actual use in an engine due to periods of operation and idleness. It will be appreciated that it is highly desirable that a pour depressant should not be thus susceptible to loss of its pour depressant ability. The present invention provides a means for stabilizing pour depressants of this type against such loss of ability. The efficiency of the invention in this respect is demonstrated by means of the heat stability test. This test simulates the temperature conditions which may be encountered in lubricating internal combustion engines. Each 24 hours of this test is about equivalent to a 1000-mile road test in an automobile. In brief, the test comprises stirring a sample of an oil blend containing the pour point depressant for 72 hours at 342° F. ±1° F. The pour point of the oil is determined every 24 hours. It is considered that a satisfactory pour point depressant should have sufficient heat stability to depress the pour point to at least −10° F. after 72 hours. Results of this test on a blend of the product of Example 22, in comparison with the (4-18) wax phenyl benzoate produced as described in Example A are set forth in Table VII. It will be apparent that the products of this invention are superior in this respect, also.

*Table VII*

| Product Tested | Conc., Wt. Percent In Oil A | Pour Point, °F. | | | |
|---|---|---|---|---|---|
| | | Initial | After 24 Hrs. | After 48 Hrs. | After 72 Hrs. |
| (4-18) Wax Phenyl Benzoate | 0.1 | −10 | 0 | 0 | 0 |
| Example 22 | 0.1 | −20 | −15 | −10 | −10 |

The pour point depressants of this invention are added to mineral lubricating oils in concentrations varying between about 0.02% and about 5%, by weight, particularly between about 0.05% and about 2%. The amount of pour point depressant will depend on the characteristics of the particular oil to be improved, in each instance. Mineral oil concentrates are also contemplated in this invention, such concentrations containing substantially larger amounts of the pour point depressant than set forth hereinbefore. Such concentrations will contain upwards of about 5%, by weight, and up to the highest soluble concentration of the additive to the oil. A suitable amount of the oil concentrate is conveniently added to an unfortified oil, prior to use, in order to produce the desired pour depressant concentration of the additive therein.

It is to be understood that, in addition to the additive of the present invention, other oil addition agents can be incorporated in the oil composition. Such additives include, for example, E. P. additives, oiliness agents, antioxidants, antirust agents, detergents, etc.

Although the present invention has been described with preferred embodiments, it is to be understood that modifications and variations may be resorted to without departing from the spirit and scope thereof, as those skilled in the art will readily understand. Such variations and modifications are considered to be within the purview and scope of the appended claims.

This application is a continuation-in-part of my copending application, Serial No. 125,829, filed November 5, 1949, now abandoned.

What is claimed is:

1. A lubricating oil composition having a stabilized low pour point comprising a major proportion of a mineral lubricating oil and a minor proportion, sufficient to lower the pour point of said oil, of a reaction product selected from the group consisting of (a) the product prepared by (1) reacting 1 mol of phenol with a sufficient amount of a chlorinated paraffin wax, containing about 18% by weight of chlorine, to supply approximately 4 atomic weights of chlorine to the reaction, at a temperature of from about 65° C. to about 177° C., to form a wax-alkylated phenol product, (2) forming a benzoate ester of the said wax-alkylated phenol product and (3) treating the said benzoate ester with a solid absorbent selected from the group consisting of activated carbon, silica gel and a bead cracking catalyst of the silica-alumina type, for a period of from about ½ hour to about 5 hours, at a temperature of from about 50° C. to about 200° C., and (b) the product prepared by (1) reacting 1 mol of phenol with a sufficient amount of chlorinated paraffin wax, containing about 18% by weight of chlorine, to supply approximately 4 atomic weights of chlorine to the reaction, at a temperature of from about 65° C. to about 177° C., to form a wax-alkylated phenol product, (2) treating the wax-alkylated phenol product with a solid absorbent selected from the group consisting of activated carbon, silica gel and bead cracking catalyst of the silica-alumina type, for a period of from about ½ hour to about 5 hours, at a temperature of from about 50° C. to about 200° C. and (3) forming the benzoate ester of the treated wax-alkylated phenol product.

2. A lubricating oil composition having a stabilized low pour point comprising a major proportion of a mineral lubricating oil and a minor proportion, sufficient to lower the pour point of said oil, of the reaction product prepared by (1) reacting 1 mol of phenol with a sufficient amount of a chlorinated paraffin wax, containing about 18% by weight of chlorine, to supply approximately 4 atomic weights of chlorine to the reaction, at a temperature of from about 65° C. to about 177° C., to form a wax-alkylated phenol product, (2) forming a benzoate ester of the wax-alkylated phenol product and (3) treating the benzoate ester with bead cracking catalyst of the silica-alumina type for a period of from about ½ hour to about 5 hours, and at a temperature of from about 50° C. to about 200° C.

3. A lubricating oil composition having a stabilized low pour point comprising a major proportion of a mineral lubricating oil and a minor proportion, sufficient to lower the pour point of said oil, of the reaction product prepared by (1) reacting 1 mol of phenol with a sufficient amount of a chlorinated paraffin wax, containing about 18% by weight of chlorine, to supply approximately 4 atomic weights of chlorine to the reaction, at a temperature of from about 65° C. to about 177° C., to form a wax-alkylated phenol product, (2) treating the wax-alkylated phenol product with a bead cracking catalyst of the silica-alumina type for a period of from about ½ hour to about 5 hours and at a temperature of from about 50° C. to about 200° C. and (3) forming the benzoate ester of the treated wax-alkylated phenol product.

References Cited in the file of this patent

UNITED STATES PATENTS

| | | |
|---|---|---|
| 2,048,465 | Reiff | July 21, 1936 |
| 2,477,671 | Warburton | Aug. 2, 1949 |